Dec. 15, 1970     H. D. GAGE     3,546,761
SMALL DIAMETER INDEXABLE ROTARY CUTTING TOOL
Filed June 24, 1969
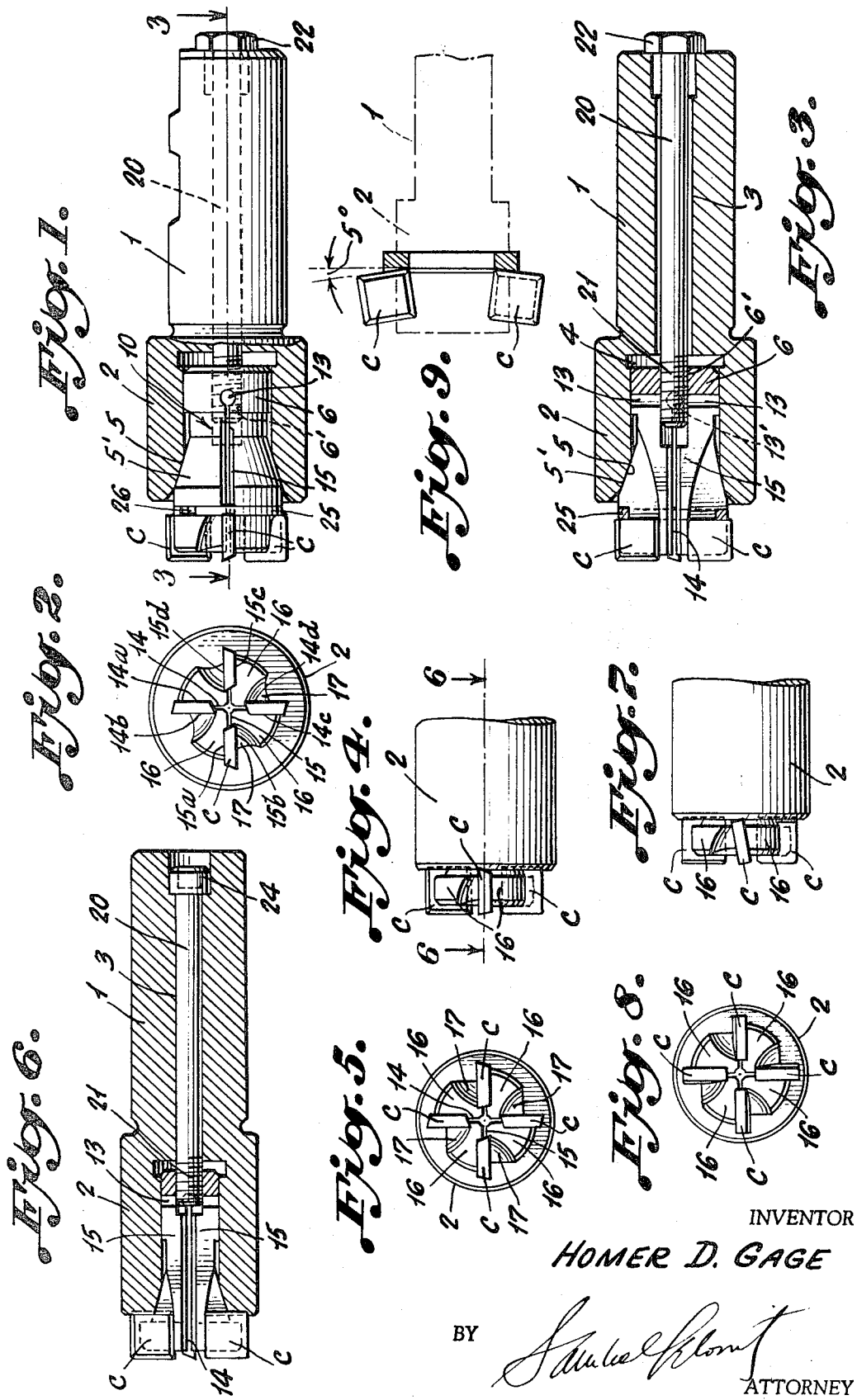
INVENTOR
HOMER D. GAGE
BY
ATTORNEY

United States Patent Office 3,546,761
Patented Dec. 15, 1970

3,546,761
SMALL DIAMETER INDEXABLE ROTARY CUTTING TOOL
Homer D. Gage, Meadville, Pa., assignor to McCrosky Tool Corporation, Meadville, Pa., a corporation of Pennsylvania
Filed June 24, 1969, Ser. No. 836,050
Int. Cl. B20d 1/12
U.S. Cl. 29—105          10 Claims

ABSTRACT OF THE DISCLOSURE

An indexable metal working tool of small diameter, which may have as many as four to six flat carbide indexable blades interchangeably inserted in variably indexed positions in radial vertical planes in a suitably split collet, and clamped between the jaws of the latter, by transforming a relative longitudinal movement between a tapered external surface on the collet and a mating internal surface in a holder therefor, into an inward radial movement of said jaws against the faces of the cutting blades. The blades are positioned accurately preparatory to their clamping by providing machined seats in said collet for one of the idle edges as well as clamping surfaces for the opposite faces of the flat indexable blades, in addition to locating stops for the blades afforded by a resilient split snap ring surrounding the jaws of the split collet, or by the end face of the tool holder, which may be suitably grooved to locate said stops more reliably.

---

This invention relates to an indexable metal working tool of small diameter, capable of accommodating a plurality of flat indexable blades which may be clamped effectively in the tool and conveniently indexed to their other cutting edges, and eventually interchanged when completely worn.

It is the object of the present invention to provide a rugged and reliable small diameter rotary cutting tool which may easily accommodate four or more flat square blades to perform the machining functions of a spot facing tool, end mill or boring tool.

This invention proceeds upon the principle of employing a split collet within a tool holder, each provided with mating tapered surfaces of revolution, which upon relative rectilinear movement therebetween results in an inward radial movement of the jaws of the collet to effect a secure clamping of the flat cutter blades for the operation of the tool. A reliable seating of the rectangular or square cutter blades may be attained by the provision of machined clamping surfaces for the opposite faces of the blades and seating surfaces for one of the idle edges thereof, which surfaces may be shaped to enable different machining functions to be performed. The latter may be attained by arranging the cutting edges at proper dish or face angles by imparting corresponding inclinations and contours to the seats for the blades which are machined in the collet in the lateral faces of the jaws at the forward ends thereof, in conjunction with locating stops for the blades formed in a resilient split snap ring surrounding the split collet or directly within the end face of the tool holder.

Other objects and purposes will appear from the detailed description of the invention following hereinafter, taken in conjunction with the accompanying drawing, wherein:

FIG. 1 is a front elevation of one embodiment of the metal working tool in accordance with the invention, with certain parts in section;
FIG. 2 is a left end view of FIG. 1;
FIG. 3 is a vertical sectional view along line 3—3 of FIG. 1;
FIG. 4 is a front elevation of the forward position of another embodiment of a rotary cutting tool in accordance with the invention;
FIG. 5 is an end view of FIG. 4;
FIG. 6 is a vertical sectional view of the complete tool, only a portion of which is shown in FIG. 4;
FIG. 7 is a front elevation of still another embodiment of the invention;
FIG. 8 is an end view of FIG. 7; and
FIG. 9 is an enlarged sectional view of a variant form of the snap ring shown in FIG. 1 to serve as a stop for the blades set at a dished angle of 5°.

In FIGS. 1 to 3 is shown a metal working tool of small diameter, for example, one to one and half inches, having a shank 1 and an enlarged portion 2 at the forward end thereof provided with a cavity 4 for receiving a split collet retainer adapted to have clamped therein at least four radially disposed flat carbide indexable blades C, despite the small diameter of the tool. The blades C are preferably square in configuration and of any hard alloy composition well known in the art of cutting tools.

The cylindrical cavity 4 is provided with a tapered surface of revolution 5 at the forward end thereof, which may slope approximately 15° relative to the longitudinal axis of the tool. A cylindrical bore 3 extends from the cavity 4 through the shank of the tool holder for the reception of bolt 20 which is threaded at the forward end 21 thereof and is fitted with an operating portion 22 at the opposite end thereof in the form of an hexagonal formation which alternatively may be a polygonal socket for the reception of an Allen wrench, as shown in another embodiment of the invention.

The split collet 10 is formed as a cylindrical surface of revolution comprising an external intermediate portion 5' of a taper identical to that of the internal surface 5 at the forward end of the tool holder 1. The tail end 6 of the collet is internally threaded at 6' for receiving the threaded end 21 of bolt 20. The collet may be provided with transverse intersecting bores 13 and 13' adjacent to the tail end thereof. The tool may be slotted by perpendicularly disposed slots 14 and 15 which extend from the transverse bores 13, 13' to the forward end of the tool, and these slots are enlarged at the peripheral portions thereof adjacent to the forward end, to provide seating surfaces on the opposite faces of each slot to accommodate the opposed faces of the flat polygonal indexable blades of the carbide type well known in the art.

As shown in FIGS. 1 to 3, the transverse slots 14 and 15 serve to subdivide the main portion of the collet into four sectors 16, which are formed with clearance spaces 17 adjacent to the lead cutting edges of the carbide blades. As shown in FIG. 2, these blades are clamped between slotted surfaces 14a and 14b of the upper sectors of the tool and between the faces 14c and 14d of the lower sectors. Likewise, a cutter blade is clamped between the juxtaposed faces 15a and 15b of the sectors 16 at the left of the tool and another cutter blade is clamped between the surfaces 15c and 15d of the sectors 16 formed by the slot 15 on the right side of the vertical axis of the tool. The seats for the blades are machined accurately to provide not only full clamping surfaces for the opposite faces of the blades but also seating surfaces for the idle edges of the blades which are positioned at the junction of the narrowed portions of the slots 14 and 15 and the widened portions thereof which seat against the opposite faces of the blades. The seats for the edges of the blades are machined at suitable angles to position either positive style inserts as shown in FIGS. 2 and 5, or negative style inserts as shown in FIG. 8.

A resilient steel split ring 25 is seated within an annular recess 26 formed in the peripheral surface of the collet between the front end thereof and the tapered portion 5'. This ring, which is preferably of rectangular section, serves as a stop against which the idle edges of the carbide indexable blades abut, to form a reliable positioning reference plane therefor.

The indexable blades may be inserted easily in the spaces between the jaws formed by the sectors at the forward end of the collet, and positioned against the split ring 25 when the tapered surfaces 5 and 5' are in loosely fitting condition. The rotation of the bolt 20 within the tool holder, serves to impart a relative longitudinal rectilinear movement to the collet in a rearward direction. This movement in turn advances surface 5' against surface 5, thereby to cause the radial sectors to approach each other inwardly and to narrow the slotted gaps therebetween, which exerts a reliable clamping action upon the carbide blades seated therein.

The split ring 25 may have cross-sections other than rectangular. The tool shown in FIGS. 1 to 3 is designed for a spot facing operation so that the forward face of the ring is perpendicular to the longitudinal axis of the tool. On the other hand the front face may be inclined to said axis as shown in FIG. 9 to form a dished surface of any desired small angularity, for example, 5°. This enables the edges of the blades adjacent thereto to assume a dished angle, for example, 3° to 5°, in which case the tool may be used to function as an end mill.

By modifying the angularity of the seats in the collet, the carbide blades may be tipped at a reverse dish angle to enable the tool to function as a boring tool. In this case it would be necessary that the enlarged portion of the shank 2 be of lesser diameter than the bits which protrude radially from the tool holder.

Another embodiment of the invention is illustrated in FIGS. 4 to 6, in which the same parts are designated by the same reference characters. In this construction the operating bolt 20 is fitted with a socketed end 24 for the accommodation of an Allen wrench to effect the rectilinear movement of the tool holder 10 relative to the shank. The end 24 is preferably seated in an enlarged cavity at the end of the tool holder. In this embodiment, the split ring surrounding the four sectors of the split collet is eliminated, and in lieu thereof the end face of the forward portion of the tool holder is notched to seat the idle edges of the indexable blades C, thereby to attain a secure positioning thereof. The faces of the forward end of the slots 14 and 15, as well as the bases thereof, are suitably machined to accommodate the negative style inserts shown in this figure. In the seating of the carbide bits illustrated in FIGS. 4 to 6, the tool functions as a spot facing tool. Here again the angularity of the bases of the notches in the end face of the tool holder may be modified to vary the function of the tool.

In the third embodiment of the invention illustrated in FIGS. 7 and 8, the clamping faces between the sectors, which are formed by machining the slots in the split collet, are angled in such directions as to impart a desired negative axial rake angle to the cutter blades. The forward end of the shank 2 is machined accordingly, to provide seats for the cutter blades in dependence of the function sought to be performed by the tool.

In this case as well, the bits may be perpendicular to the axis of the tool, dished, or angled, to enable the desired machining operations to be executed. If a boring function is to be performed, it is necessary that the portion 2 of the tool be of lesser diameter than the radial dimensions of the outer extremities of the bits.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:
1. A rotary metal cutting tool comprising:
    (a) a hollow tool holder having an inner bore comprising a tapered surface of revolution along a portion of the length of the bore and extending from the forward end of the tool holder towards the tail end thereof,
    (b) a detachable split collet mounted in said bore, and said collet adapted to clamp therein a plurality of indexable flat cutter blades,
    (c) said split collet having an internally threaded portion at the rear end thereof, and provided with a plurality of transversely disposed diametral slots extending across the forward end of the collet to subdivide said end into a plurality of sectors and thereby to impart a slight degree of flexibility to the sectors between said slots at said forward end,
    (d) said split collet formed as an external surface of revolution at said forward end and comprising a tapered portion complementary to said tapered bore surface on the interior of said hollow shank,
    (e) a threaded bolt extending into said bore of said tool holder from the tail end thereof into threaded engagement with said internally threaded portion of said split collet to selectively contract said sectors of the latter at the forward end thereof by the relative rearward movement of the collet and the constriction enforced on said forward section by the mating tapered surfaces on said hollow tool holder and said collet, as rotary movement of the bolt effects a relative rearward rectilinear movement of said collet, thereby to clamp said flat cutter blades between the faces of said sectors at the slotted laternal surfaces thereof, and
    (f) positioning means on said tool in supplement to the opposite lateral clamping surfaces of said sectors for seating said blades in said collet.

2. A device as set forth in claim 1, wherein said last-mentioned means comprises a detachable split snap ring surrounding said collet within a groove formed in the peripheral surface of said collet, rearwardly from the front end of the latter, said snap ring functioning as an abutment stop for the edges of said cutter blades remote from the cutting edges thereof.

3. A device as set forth in claim 2, wherein the forward face of said snap ring is disposed in a plane other than perpendicular relative to the longitudinal axis of the tool.

4. A device as set forth in claim 3, wherein said forward face has a dished angle ranging from 3° to 5° to the perpendicular.

5. A device as set forth in claim 1, wherein said last-mentioned means is constituted by the forward face of said hollow tool holder.

6. A device as set forth in claim 5, wherein said forward face of said tool holder is provided with a plurality of radial grooves corresponding in number to said indexable flat cutter blades, each groove adapted to seat an idle edge of one of the cutter blades.

7. A device as set forth in claim 1, wherein said tool holder is approximately one inch in diameter at the forward end thereof, and is provided with four radial slots for seating four flat cutter blades.

8. A device as set forth in claim 1, wherein the cutting edges of the flat cutter blades are perpendicular to the axis of the cutting tool for spot facing a workpiece.

9. A device as set forth in claim 5, wherein the stops for the cutter blades in the forward face of the tool holder are formed at variable inclinations to a plane perpendicular to the axis of the cutting tool to vary the inclination of the cutting edges relative to said plane, adapted to execute spot facing, face milling or boring operations.

10. A device as set forth in claim 8, including formed stops for the cutting blades in the forward face of the tool holder adapted to accommodate positive or negative style indexable carbide blades.

References Cited
UNITED STATES PATENTS

| | | | |
|---|---|---|---|
| 3,367,007 | 2/1968 | Ziegler | 29—105 |
| 3,300,834 | 1/1967 | Stone | 29—105 |
| 3,345,721 | 10/1967 | Garih | 29—105 |

HARRISON L. HINSON, Primary Examiner